(12) United States Patent
Dinu et al.

(10) Patent No.: US 8,821,598 B2
(45) Date of Patent: Sep. 2, 2014

(54) CONTROL SYSTEM AND METHOD TO OPERATE A QUENCH SCRUBBER SYSTEM UNDER HIGH ENTRAINMENT

(75) Inventors: Constantin Dinu, Katy, TX (US); George Gulko, Houston, TX (US); Judeth Brannon Corry, Manvel, TX (US); Allyson Joy Jimenez-Huyke, Houston, TX (US); Richard L. Zhao, Chicago, IL (US); Denise Marie Rico, Houston, TX (US)

(73) Assignee: General Electric Company, Schenectady, NY (US)

( * ) Notice: Subject to any disclaimer, the term of this patent is extended or adjusted under 35 U.S.C. 154(b) by 743 days.

(21) Appl. No.: 12/510,229

(22) Filed: Jul. 27, 2009

(65) Prior Publication Data

US 2011/0016787 A1  Jan. 27, 2011

(51) Int. Cl.
 *B01J 7/00* (2006.01)
(52) U.S. Cl.
 USPC .............................................. 48/61
(58) Field of Classification Search
 USPC ........................................ 48/61–118.5, 127.9
 See application file for complete search history.

(56) References Cited

U.S. PATENT DOCUMENTS

| | | | |
|---|---|---|---|
| 3,147,093 A * | 9/1964 | Dille et al. .................... 95/205 |
| 3,152,090 A * | 10/1964 | Cobel et al. .................... 502/227 |
| 3,232,727 A * | 2/1966 | Guptill, Jr. et al. ............. 48/215 |
| 3,232,728 A * | 2/1966 | Reynolds ........................ 48/215 |
| 3,941,875 A * | 3/1976 | Tsuruta et al. ................. 423/571 |
| 3,980,592 A | 9/1976 | Marion |
| 4,016,102 A * | 4/1977 | Marion .......................... 252/373 |
| 4,016,104 A * | 4/1977 | Marion .......................... 252/373 |
| 4,197,281 A * | 4/1980 | Muenger et al. .............. 423/359 |
| 4,465,496 A * | 8/1984 | Suggitt ........................ 48/197 R |
| 4,531,949 A * | 7/1985 | Koyama et al. ................. 48/202 |
| 4,588,418 A * | 5/1986 | Gabler et al. ................. 48/197 R |
| 4,644,877 A * | 2/1987 | Barton et al. ................. 588/311 |
| 4,704,137 A * | 11/1987 | Richter ........................ 48/197 R |
| 4,778,483 A | 10/1988 | Martin et al. |
| 4,876,987 A | 10/1989 | Martin et al. |
| 4,936,376 A | 6/1990 | Martin et al. |
| 5,233,943 A | 8/1993 | Martin et al. |
| 5,415,673 A * | 5/1995 | Hilton et al. ................. 48/197 R |
| 5,900,224 A | 5/1999 | Fujimura et al. |
| 5,980,858 A | 11/1999 | Fujimura et al. |
| 6,269,286 B1 | 7/2001 | Tse et al. |
| 6,755,980 B1 * | 6/2004 | Van Den Born et al. ..... 210/767 |
| 6,902,711 B1 * | 6/2005 | Fujimura et al. ............. 422/140 |
| 2008/0000155 A1 | 1/2008 | Van Den Berg et al. |

(Continued)

FOREIGN PATENT DOCUMENTS

CN    1163375 A    10/1997
CN    1253577 A    5/2000

OTHER PUBLICATIONS

Office Action from corresponding Chinese Patent Application No. 201010246445.X, dated May 27, 2013.

(Continued)

*Primary Examiner* — Imran Akram
(74) *Attorney, Agent, or Firm* — Fletcher Yoder, P.C.

(57) ABSTRACT

In certain embodiments, a system includes a first water supply pump configured to pump water from a gas scrubber sump of a gas scrubber directly to a quench chamber sump of a quench chamber via a first water supply line.

13 Claims, 6 Drawing Sheets

(56) References Cited

U.S. PATENT DOCUMENTS

| | | |
|---|---|---|
| 2008/0047198 A1* | 2/2008 | Mehlhose et al. ............. 48/210 |
| 2009/0038155 A1 | 2/2009 | Corry |
| 2009/0041642 A1 | 2/2009 | Storey et al. |
| 2009/0047193 A1 | 2/2009 | Corry et al. |
| 2009/0173484 A1 | 7/2009 | Storey et al. |
| 2009/0202403 A1* | 8/2009 | Jimenez-Huyke et al. ... 422/198 |
| 2010/0059456 A1* | 3/2010 | Wang et al. ................. 210/774 |
| 2010/0170247 A1* | 7/2010 | Bommareddy et al. ........ 60/653 |
| 2010/0325957 A1* | 12/2010 | Klockow et al. ................. 48/87 |

OTHER PUBLICATIONS

Patent Office of the Russian Federation (ROSPATENT); Office Action (Enquiry); Application No. 2010130903/05; Dated May 27, 2014; 2 pages.

* cited by examiner

CONTROL SYSTEM AND METHOD TO OPERATE A QUENCH SCRUBBER SYSTEM UNDER HIGH ENTRAINMENT

BACKGROUND OF THE INVENTION

The subject matter disclosed herein relates to systems and methods for operating a quench scrubber system under high entrainment.

In general, integrated gasification combined cycle (IGCC) power plants are capable of generating energy from various hydrocarbon feedstock, such as coal, relatively cleanly and efficiently. IGCC technology may convert the hydrocarbon feedstock into a gas mixture of carbon monoxide and hydrogen, i.e., "syngas" (synthetic gas), by reaction with steam or water in a gasifier. These gases may be cleaned, processed, and utilized as fuel in a conventional combined cycle power plant. For example, the syngas may be fed into a combustor of a gas turbine of the IGCC power plant and ignited to power the gas turbine for use in the generation of electricity. In certain applications, the syngas produced by the gasifier may be used to produce chemicals and not for use in an IGCC power plant. Often, an excessive amount of water may be entrained within the syngas generated by the gasifier.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a gasifier. The gasifier includes a reaction chamber configured to convert a hydrocarbon feedstock, oxygen, and steam into a synthetic gas. The gasifier also includes a quench chamber configured to cool the synthetic gas. The system also includes a gas scrubber configured to remove contaminants and water from the synthetic gas. The system further includes a synthetic gas transfer line from the quench chamber to the gas scrubber. The synthetic gas transfer line is configured to transfer the synthetic gas from the quench chamber to the gas scrubber. The system also includes a first water return flow line from a gas scrubber sump of the gas scrubber to a quench ring of the quench chamber. The first water return flow line is configured to transfer a first flow of the water to the quench ring of the quench chamber. The system also includes a second water return flow line from the gas scrubber sump of the gas scrubber to a quench chamber sump of the quench chamber. The second water return flow line is configured to transfer a second flow of the water removed from the synthetic gas to the quench chamber sump of the quench chamber.

In a second embodiment, a system includes a quench chamber and a gas scrubber. The system also includes a first flow line from a gas scrubber sump of the gas scrubber directly to a quench chamber sump of the quench chamber. The system further includes a first pump in the first flow line configured to pump a first flow of water from the gas scrubber sump of the gas scrubber directly to the quench chamber sump of the quench chamber through the first flow line.

In a third embodiment, a system includes a first water supply pump configured to pump water from a gas scrubber sump of a gas scrubber directly to a quench chamber sump of a quench chamber via a first water supply line.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments include systems and methods for operating a gasifier quench scrubber system under high entrainment (e.g., a high amount of water trapped within the syngas generated by the gasifier). The gasifier quench scrubber system may include a gasifier having a reaction chamber and a quench chamber, and a gas scrubber unit. In general, syngas may be generated within the reaction chamber of the gasifier. The syngas may be generated at extremely high pressures and temperatures. As such, the quench chamber of the gasifier may be used to cool the syngas before the syngas is directed into the gas scrubber unit, where contaminants and entrained water may be removed. The quench chamber may generally use quench water from the gas scrubber unit to cool the syngas. In particular, the quench water may be introduced into a quench ring of the quench chamber. Unfortunately, during the quench cooling process, a certain amount of the quench water may become entrained in vapor and liquid phase within the generated syngas. The disclosed embodiments may be used to reduce the amount of excessive water entrainment within the syngas by directing a portion of the water from the gas scrubber unit directly into a sump of the quench chamber. In general, the supplemental water may be directed into the sump of the quench chamber through a secondary water return line, which may generally run parallel to a primary water return line, which is used to direct the quench water from the gas scrubber unit into the quench ring of the quench chamber. By directing a portion of the water from the gas scrubber unit directly into the sump of the quench chamber instead of into the quench ring of the quench chamber, the gasifier quench scrubber system may be capable of operating at higher throughput rates with minimal or no changes to the gasifier quench scrubber system.

Figure 1:
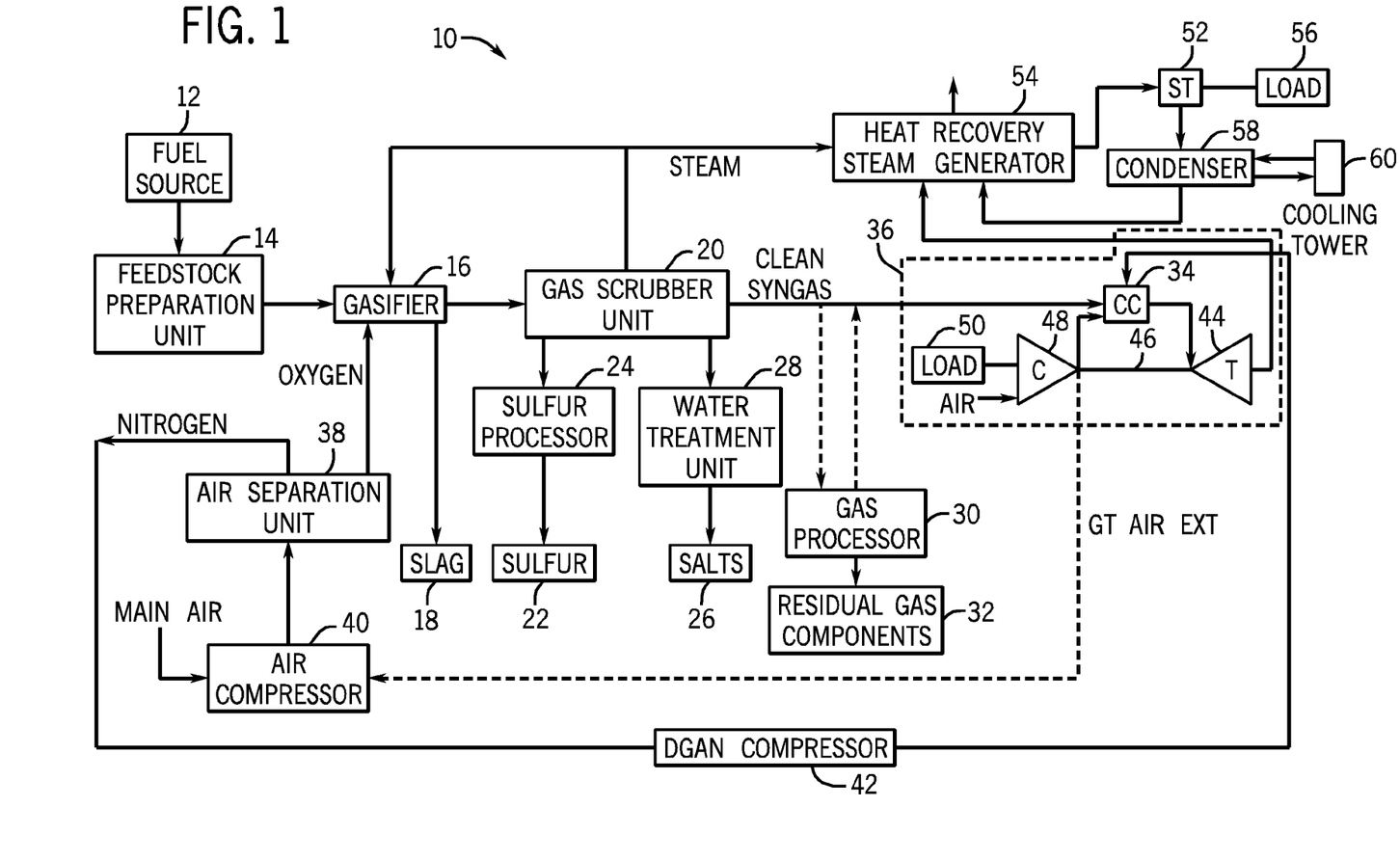
FIG. 1 is a schematic block diagram of an embodiment of an integrated gasification combined cycle (IGCC) power plant.

FIG. 1 is a diagram of an embodiment of an integrated gasification combined cycle (IGCC) system 10 that may be powered by syngas. Components of the IGCC system 10 may include a fuel source 12, such as a solid feed, which may be utilized as a source of energy for the IGCC system 10. The fuel source 12 may include coal, petroleum coke, biomass, wood-based materials, agricultural wastes, tars, coke oven gas and asphalt, or other carbon containing items.

The solid fuel of the fuel source 12 may be passed to a feedstock preparation unit 14. The feedstock preparation unit 14 may, for example, resize or reshape the fuel source 12 by chopping, milling, shredding, pulverizing, briquetting, or palletizing the fuel source 12 to generate feedstock. Additionally, water, or other suitable liquids, may be added to the fuel source 12 in the feedstock preparation unit 14 to create slurry feedstock. In other embodiments, no liquid is added to the fuel source 12, thus yielding dry feedstock.

The feedstock may be passed to a gasifier 16 from the feedstock preparation unit 14. The gasifier 16 may convert the feedstock into syngas, e.g., a combination of carbon monoxide and hydrogen. This conversion may be accomplished by subjecting the feedstock to a controlled amount of steam and oxygen at elevated pressures (e.g., from approximately 400 psia-1300 psia) and temperatures (e.g., approximately 2200° F.-2700° F.), depending on the type of gasifier 16 utilized. The heating of the feedstock during a pyrolysis process may generate a solid (e.g., char) and residue gases (e.g., carbon monoxide, hydrogen, and nitrogen). The char remaining from the feedstock from the pyrolysis process may only weigh up to approximately 30% of the weight of the original feedstock.

The combustion reaction in the gasifier 16 may include introducing oxygen to the char and residue gases. The char and residue gases may react with the oxygen to form carbon dioxide and carbon monoxide, which provides heat for the subsequent gasification reactions. The temperatures during the combustion process may range from approximately 2200° F. to approximately 2700° F. In addition, steam and/or water may be introduced into the gasifier 16. The gasifier utilizes steam and/or water and oxygen to allow some of the feedstock to be burned to produce carbon monoxide and energy and drive a second reaction that converts further feedstock to hydrogen and additional carbon dioxide.

In this way, a resultant gas may be manufactured by the gasifier 16. For example, the resultant gas (syngas) may include approximately 85% of carbon monoxide and hydrogen, as well as $CH_4$, HCl, HF, COS, $NH_3$, HCN, and $H_2S$ (based on the sulfur content of the feedstock). However, the syngas composition may vary within wide ranges, depending on the feedstock used and/or the specific gasification application. This resultant gas may be termed "dirty syngas." The gasifier 16 may also generate waste, such as slag 18, which may be a wet ash material. As described in greater detail below, a gas scrubber unit 20 may be utilized to clean the dirty syngas. The gas scrubber unit 20 may scrub the dirty syngas to remove the HCl, HF, COS, HCN, and $H_2S$ from the dirty syngas, which may include separation of sulfur 22 in a sulfur processor 24 by, for example, an acid gas removal process in the sulfur processor 24. Furthermore, the gas scrubber unit 20 may separate salts 26 from the dirty syngas via a water treatment unit 28, which may utilize water purification techniques to generate usable salts 26 from the dirty syngas. Subsequently, a clean syngas may be generated from the gas scrubber unit 20.

A gas processor 30 may be utilized to remove residual gas components 32 from the clean syngas, such as ammonia and methane, as well as methanol or other residual chemicals. However, removal of residual gas components 32 from the clean syngas is optional since the clean syngas may be utilized as a fuel even when containing the residual gas components 32 (e.g., tail gas). This clean syngas may be directed into a combustor 34 (e.g., a combustion chamber) of a gas turbine engine 36 as combustible fuel.

The IGCC system 10 may further include an air separation unit (ASU) 38. The ASU 38 may separate air into component gases using, for example, distillation techniques. The ASU 38 may separate oxygen from the air supplied to it from a supplemental air compressor 40 and may transfer the separated oxygen to the gasifier 16. Additionally, the ASU 38 may direct separated nitrogen to a diluent nitrogen (DGAN) compressor 42. The DGAN compressor 42 may compress the nitrogen received from the ASU 38 at least to pressure levels equal to those in the combustor 34, so as to not interfere with proper combustion of the syngas. Thus, once the DGAN compressor 42 has adequately compressed the nitrogen to an adequate level, the DGAN compressor 42 may direct the compressed nitrogen to the combustor 34 of the gas turbine engine 36.

As described above, the compressed nitrogen may be transferred from the DGAN compressor 42 to the combustor 34 of the gas turbine engine 36. The gas turbine engine 36 may include a turbine 44, a drive shaft 46, and a compressor 48, as well as the combustor 34. The combustor 34 may receive fuel, such as the syngas, which may be injected under pressure from fuel nozzles. This fuel may be mixed with compressed air as well as compressed nitrogen from the DGAN compressor 42 and combusted within the combustor 34. This combustion may create hot pressurized exhaust gases.

The combustor 34 may direct the exhaust gases towards an exhaust outlet of the turbine 44. As the exhaust gases from the combustor 34 pass through the turbine 44, the exhaust gases may force turbine blades in the turbine 44 to rotate the drive shaft 46 along an axis of the gas turbine engine 36. As illustrated, the drive shaft 46 may be connected to various components of the gas turbine engine 36, including the compressor 48.

The drive shaft 46 may connect the turbine 44 to the compressor 48 to form a rotor. The compressor 48 may include blades coupled to the drive shaft 46. Thus, rotation of turbine blades in the turbine 44 may cause the drive shaft 46 connecting the turbine 44 to the compressor 48 to rotate blades within the compressor 48. The rotation of blades in the compressor 48 causes the compressor 48 to compress air received via an air intake in the compressor 48. The compressed air may then be fed to the combustor 34 and mixed with fuel and compressed nitrogen to allow for higher efficiency combustion. The drive shaft 46 may also be connected to a load 50, which may be a stationary load, such as an electrical generator, for producing electrical power in a power plant. Indeed, the load 50 may be any suitable device that is powered by the rotational output of the gas turbine engine 36.

The IGCC system 10 also may include a steam turbine engine 52 and a heat recovery steam generation (HRSG) system 54. The steam turbine engine 52 may drive a second load 56, such as an electrical generator for generating electrical power. However, both the first and second loads 50, 56 may be other types of loads capable of being driven by the gas turbine engine 36 and the steam turbine engine 52, respectively. In addition, although the gas turbine engine 36 and the steam turbine engine 52 may drive separate loads 50, 56, as shown in the illustrated embodiment, the gas turbine engine 36 and the steam turbine engine 52 may also be utilized in tandem to drive a single load via a single shaft. The specific configuration of the steam turbine engine 52, as well as the gas turbine engine 36, may be implementation-specific and may include any combination of sections.

Heated exhaust gas from the gas turbine engine 36 may be directed into the HRSG 54 and used to heat water and produce steam used to power the steam turbine engine 52. Exhaust from the steam turbine engine 52 may be directed into a condenser 58. The condenser 58 may utilize a cooling tower 60 to exchange heated water for chilled water. In particular, the cooling tower 60 may provide cool water to the condenser 58 to aid in condensing the steam directed into the condenser 58 from the steam turbine engine 52. Condensate from the condenser 58 may, in turn, be directed into the HRSG 54. Again, exhaust from the gas turbine engine 36 may also be directed into the HRSG 54 to heat the water from the condenser 58 and produce steam.

As such, in combined cycle systems such as the IGCC system 10, hot exhaust may flow from the gas turbine engine 36 to the HRSG 54, where it may be used to generate high-pressure, high-temperature steam. The steam produced by the HRSG 54 may then be passed through the steam turbine engine 52 for power generation. In addition, the produced steam may also be supplied to any other processes where steam may be used, such as to the gasifier 16. The gas turbine engine 36 generation cycle is often referred to as the "topping cycle," whereas the steam turbine engine 52 generation cycle is often referred to as the "bottoming cycle." By combining these two cycles as illustrated in FIG. 1, the IGCC system 10 may lead to greater efficiencies in both cycles. In particular, exhaust heat from the topping cycle may be captured and used to generate steam for use in the bottoming cycle. It should be noted that the disclosed embodiments may also be utilized in non-IGCC gasification processes, such as methanol, ammonia, or other syngas-related processes.

Figure 2:
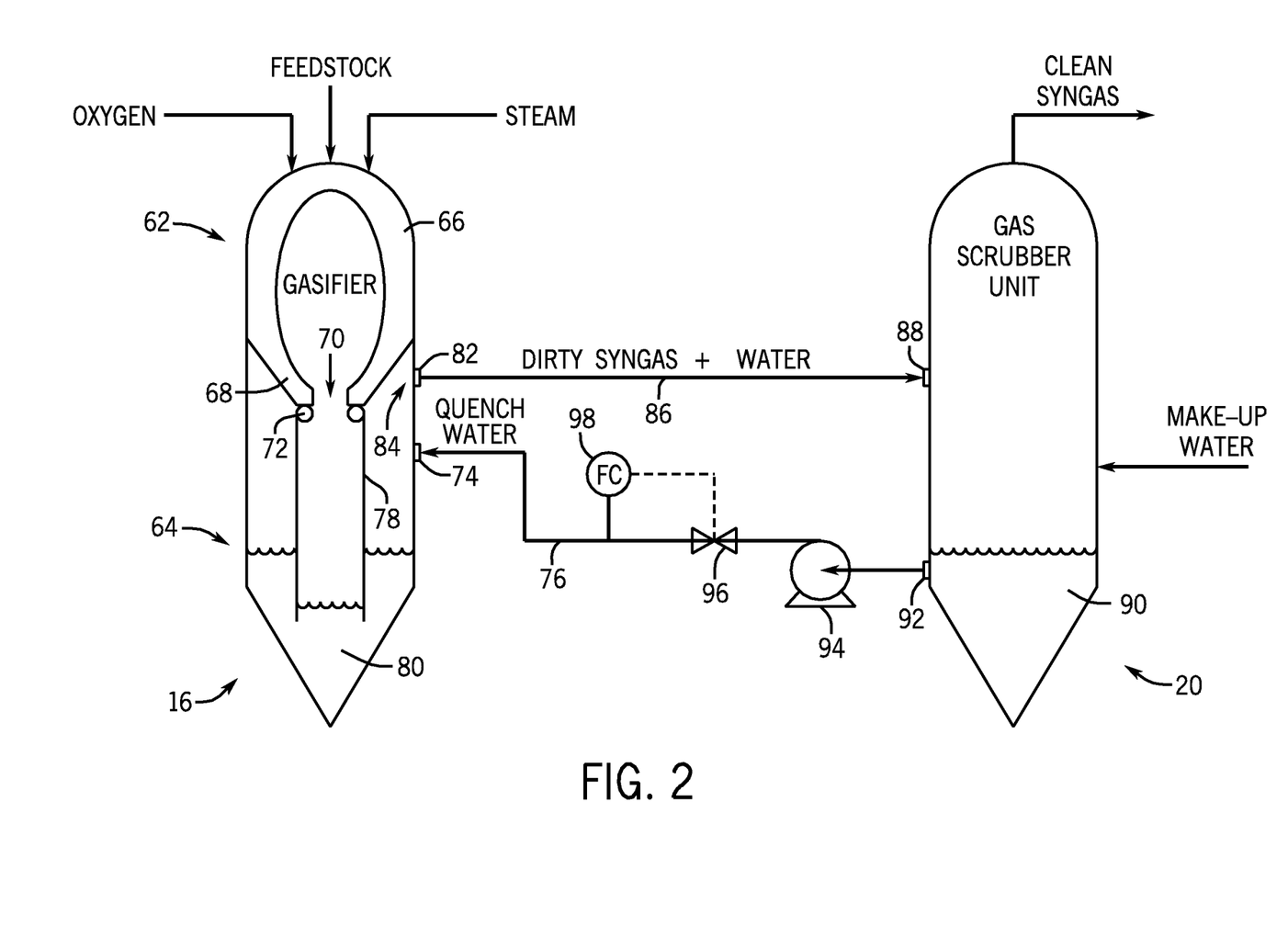
FIG. 2 is a schematic diagram of an exemplary embodiment of the gasifier and the gas scrubber unit of FIG. 1.

As described above, the gas scrubber unit 20 may ensure that the dirty syngas from the gasifier 16 is cleaned before directing the clean syngas into the combustor 34 of the gas turbine engine 36, where the clean syngas may be mixed with compressed air and nitrogen and combusted. FIG. 2 is a schematic diagram of an exemplary embodiment of the gasifier 16 and the gas scrubber unit 20 of FIG. 1. As illustrated, in certain embodiments, the gasifier 16 may include a reaction chamber 62 and a quench chamber 64. The reaction chamber 62 may be defined by a refractory lining 66. As described above, feedstock (e.g., coal slurry) from the feedstock preparation unit 14, along, with oxygen and steam from the ASU 38 and the HRSG 54, respectively, may be introduced into the reaction chamber 62 of the gasifier 16, where they may be converted into dirty syngas. The dirty syngas may include slag and other contaminants.

As described above, the dirty syngas generated within the reaction chamber 62 of the gasifier 16 may be at elevated pressures and temperatures. For example, the pressure and temperature of the resultant dirty syngas may be approximately 400 psia-1300 psia and approximately 2200° F.-2700° F., respectively, depending on the type of gasifier 16 utilized. The high-pressure, high-temperature dirty syngas may enter the quench chamber 64 through a bottom end 68 of the refractory lining 66, as illustrated by arrow 70. In general, the quench chamber 64 may be used to reduce the temperature of the dirty syngas. In certain embodiments, a quench ring 72 may be located proximate to the bottom end 68 of the refractory lining 66. As illustrated, quench water may be received from a primary water return line 76 through a quench water inlet 74 into the quench chamber 64. In general, the quench water may flow through the quench ring 72 and down a dip tube 78 into a quench chamber sump 80. As such, the quench water may cool the dirty syngas, which may subsequently exit the quench chamber 64 through a syngas outlet 82 after being cooled, as illustrated by arrow 84. The syngas outlet 82 may generally be located separate from and above the quench chamber sump 80 and may be connected to a syngas transfer line 86, which may be used to transfer the dirty syngas into the gas scrubber unit 20 through a syngas inlet 88.

As described above, the gas scrubber unit 20 may be used to clean the dirty syngas to create clean syngas, which may ultimately be directed into the combustor 34 of the gas turbine engine 36 of FIG. 1. More specifically, the gas scrubber unit 20 may scrub the dirty syngas to remove fine solid particles and other contaminants. In addition, as described above, the dirty syngas may contain a certain amount of entrained water. The gas scrubber unit 20 may also be used to remove a substantial portion of the remaining entrained water from the dirty syngas. The removed water may collect in a gas scrubber unit sump 90 of the gas scrubber unit 20.

In certain embodiments, the water collected in the gas scrubber unit sump 90, as well as make-up water into the gas scrubber unit 20, may be used as quench water within the quench chamber 64 of the gasifier 16. In particular, quench water from the gas scrubber unit 20 may be pumped from a quench water outlet 92 of the gas scrubber unit 20 by a primary water return pump 94. In certain embodiments, a primary flow control valve 96 may be used to control the flow of the quench water into the quench water inlet 74 through the primary water return line 76. In addition, a primary flow control sensor 98, such as a flow meter, may be used to provide feedback for controlling the primary flow control valve 96. Similar to the syngas outlet 82, the quench water inlet 74 may generally be located separate from and above the quench chamber sump 80 of the gasifier 16 and, as described above, may direct the flow of quench water into the quench ring 72.

However, the embodiment illustrated in FIG. 2 is not without certain drawbacks. For example, the water lost through evaporation (e.g., from the syngas quenching) and entrainment (e.g., the liquid water carried away by the dirty syngas leaving the quench chamber 64) may be returned through the quench ring 72, which delivers the water through a water film to the dip tube 78. Because of the entrainment, the amount of quench water used within the quench chamber 64 during operation may exceed the theoretical amount required for saturation and cooling. Moreover, the amount of quench water that can be supplied through the quench ring 72 may be limited in range. For example, an increase in the amount of quench water flow through the quench ring 72 may be accompanied by pressure drops that are proportional to the square of the amount of quench water flow rate. For example, if the quench water flow rate increases by 50% (e.g., a factor of 1.5), the pressure drop across the quench ring may increase by 125% (e.g., a factor of 1.5×1.5=2.25). Due to operational variability and operating constraints, the amount of water entrainment within the dirty syngas may increase to high enough levels that the IGCC system 10 may experience forced shutdowns.

Figure 3:
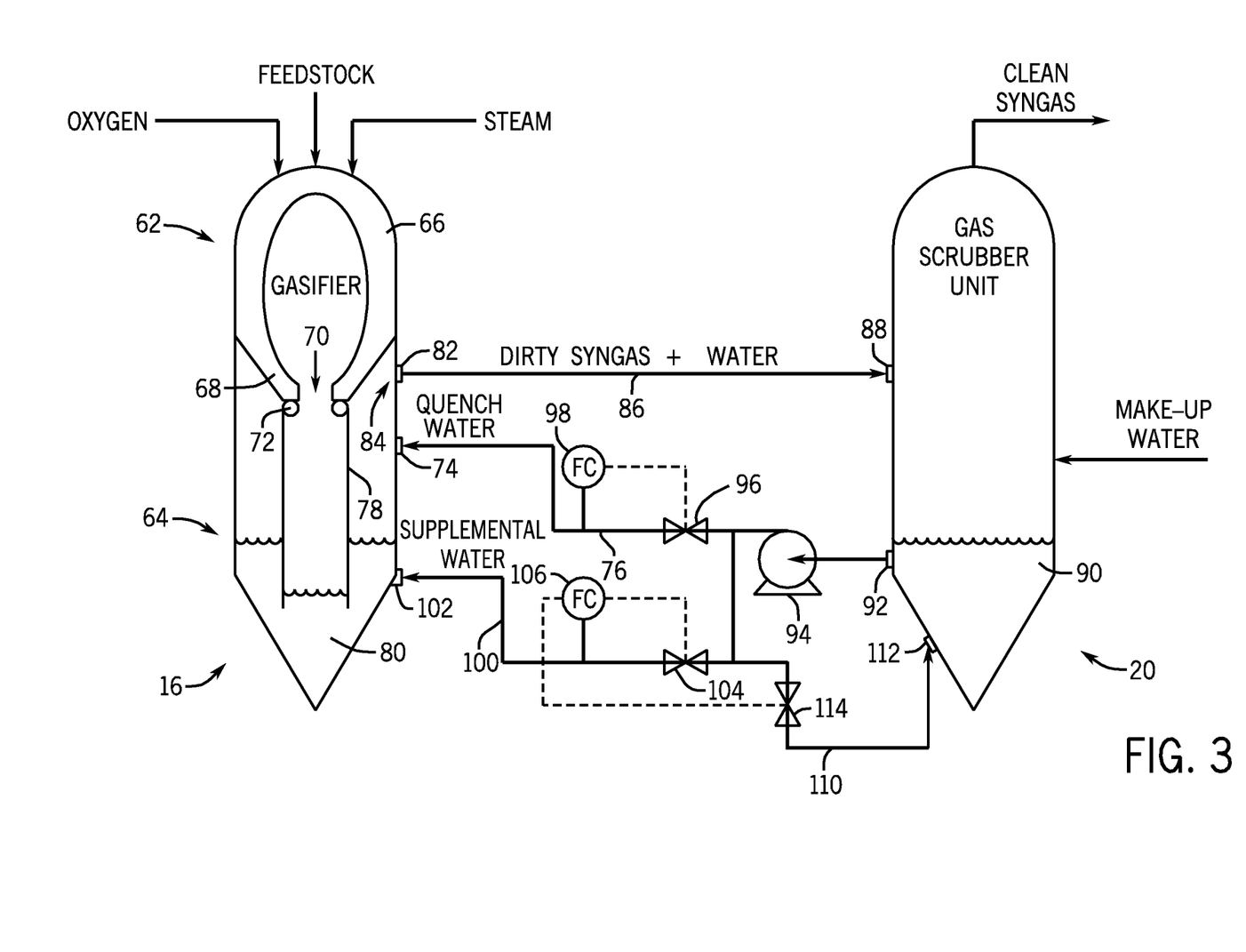
FIG. 3 is a schematic diagram of an exemplary embodiment of the gasifier and the gas scrubber unit of FIG. 1, utilizing both a primary water return line and a secondary water return line.

Therefore, in certain embodiments, a secondary water return line may be utilized. For example, FIG. 3 is a schematic diagram of an exemplary embodiment of the gasifier 16 and the gas scrubber unit 20 of FIG. 1, utilizing both the primary water return line 76 and a secondary water return line 100. As illustrated, the secondary water return line 100 may direct supplemental water directly into the quench chamber sump 80 through a quench chamber sump inlet 102, as opposed to through the quench water inlet 74, which is located separate from and above the quench chamber sump 80. In certain embodiments, a secondary flow control valve 104 may be used to control the flow of the supplemental water into the quench chamber sump inlet 102 through the secondary water return line 100. In addition, a secondary flow control sensor 106, such as a flow meter, may be used to provide feedback for controlling the secondary flow control valve 104. In particular, flow control sensors 98 and 106 ensure appropriate water flows into the quench chamber 64 from the primary water return pump 94, with the remaining water being sent back through a water bypass line 110 to the gas scrubber unit sump 90 of the gas scrubber unit 20. More specifically, in certain embodiments, the primary and secondary control valves 96, 104 may be controlled together to ensure that an appropriate amount of water is split between the primary water return line 76 and the secondary water return line 100 as quench water and supplemental water, respectively. In general, excess supplemental water may be sent directly into the quench chamber sump 80 through the secondary water return line 100 when the amount of quench water through the quench ring 72 reaches a predetermined threshold amount.

However, the embodiment illustrated in FIG. 3 is also not without certain drawbacks. For example, in general, since only one primary water return pump 94 is used to pump the quench water from the gas scrubber unit sump 90 of the gas scrubber unit 20, the primary and secondary control valves 96, 104 may, in certain embodiments, be necessary to control the flow of water between the primary and secondary water return lines 76, 100. However, the ability to control the flow of water between the primary and secondary water return lines 76, 100 without using flow control valves may prove beneficial.

Figure 4:
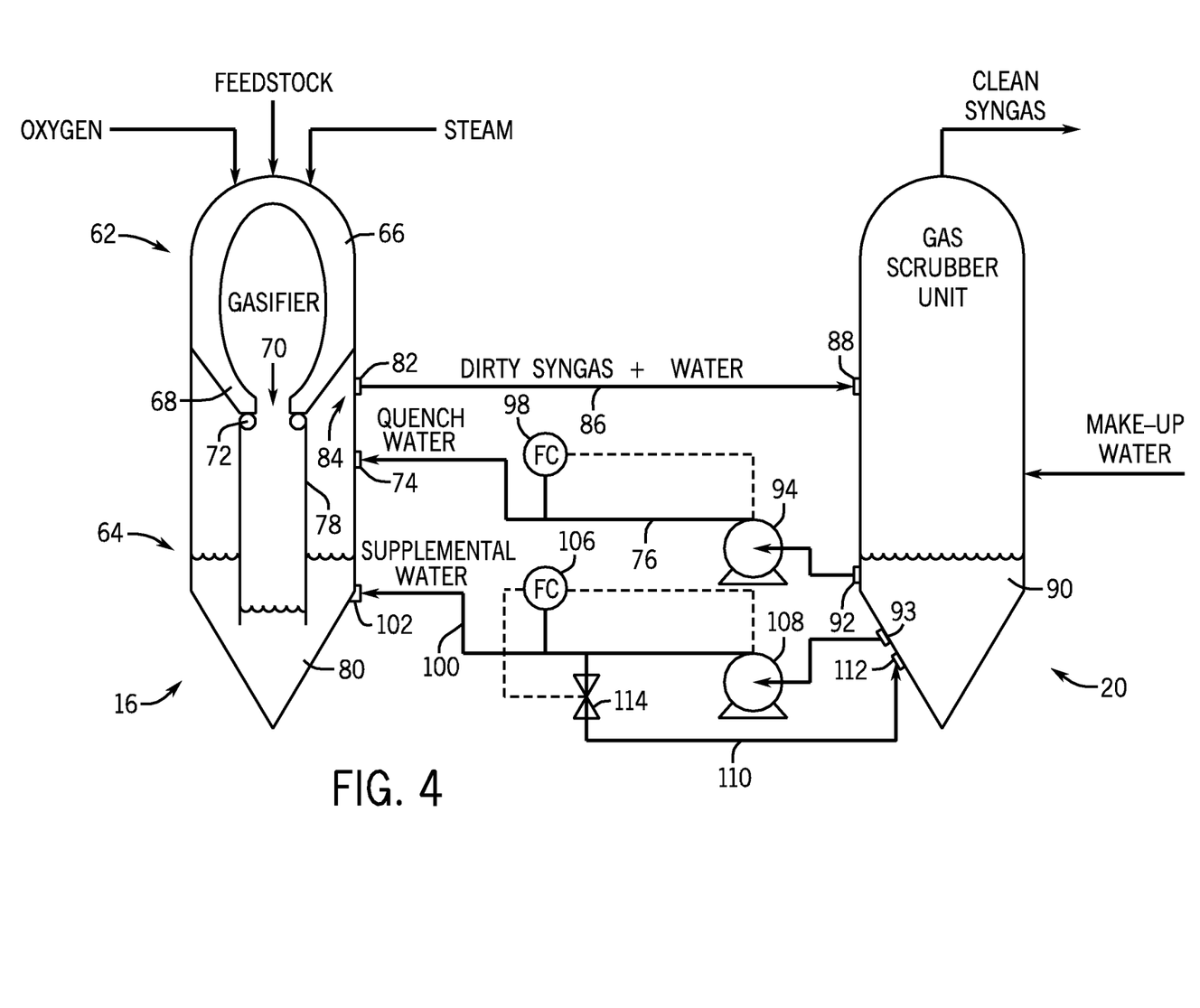
FIG. 4 is a schematic diagram of an exemplary embodiment of the gasifier and the gas scrubber unit of FIG. 1, utilizing both the primary water return line and the secondary water return line, as well as a primary water return pump and a secondary water return pump.

FIG. 4 is a schematic diagram of an exemplary embodiment of the gasifier 16 and the gas scrubber unit 20 of FIG. 1, utilizing both the primary water return line 76 and the secondary water return line 100 as well as the primary water return pump 94 and a secondary water return pump 108. In certain embodiments, as illustrated, the secondary water return line 100 may be fed from a second quench water outlet 93 of the gas scrubber unit 20. As illustrated, both the primary water return line 76 and the secondary water return line 100 may be associated with a respective water return pump 94, 108. In certain embodiments, the primary and secondary water return pumps 94, 108 may be variable-speed pumps, such that the water flow rate generated by each water return pump 94, 108 may be directly controlled or the primary and secondary water return pumps 94, 108 may operate at constant speeds with flow control (e.g., via the flow control sensors 98 and 106 and associated flow controllers) and active bypass (e.g., via the water bypass line 110), as needed. However, in other embodiments, both the primary water return line 76 and the secondary water return line 100 may be equipped with isolation valves and/or control valves to help isolate one or both of the water return lines 76, 100 and/or control the flow rate of water through the water return lines 76, 100.

The embodiments illustrated in FIGS. 3 and 4 provide for increased plant operational flexibility by allowing higher production throughputs of syngas from the gasifier 16 without major modifications to the quench chamber 64. In operation, before startup of the IGCC system 10, the secondary water return line 100 may be filled with relatively clean water at the end of a purge sequence. This may ensure that the secondary water return pump 108 on the secondary water return line 100 is primed and always ready to operate. In certain embodiments, the primary water return line 76 and associated primary water return pump 94 will operate during normal operating conditions while the secondary water return line 100 and associated secondary water return pump 108 will operate only when the flow rate of quench water into the quench ring 72 reaches a predetermined threshold amount.

In general, the primary water return line 76 and the quench ring 72 may be sized to provide adequate operation at startup, during low load (e.g., turndown) and normal operating conditions, which may include moderate water entrainment (e.g., below approximately 20% water-to-syngas ratio). In certain embodiments, the primary water return line 76 may be operated in a control loop, which may include monitoring of make-up water (e.g., additional water used to supplement the flow of water to and from the gasifier 16 and gas scrubber unit 20) through the gas scrubber unit 20. Indeed, the presence of excess water entrainment may be indicated when the flow of make-up water decreases below a design point for the gas scrubber unit 20. When the make-up water flow rate decreases below the design point, the quench water flow rate through the primary water return line 76 may be increased such that the make-up water flow rate through the gas scrubber unit 20 may increase toward the design point.

However, if excessive water entrainment occurs, the capacity of the primary water return line 76 may be reached before the make-up water flow rate through the gas scrubber unit 20 reaches the design point. When this happens, the secondary water return pump 108 on the secondary water return line 100 may be turned on. Initially, all of the water entrainment flow may be gradually transferred from the primary water return line 76 to the secondary water return line 100. At the end of this sequence, the primary water return line 76 may be operated at normal operating conditions and all of the water entrainment may be supplied through the secondary water return line 100. The water entrainment capacity of the secondary water return line 100 may generally be higher than the water entrainment capacity of the primary water return line 76.

In addition, the amount of water entrainment in the syngas may further be compensated for by increasing the flow rate of quench water through the secondary water return line 100 until the flow rate of make-up water through the gas scrubber unit 20 is re-established to the design point. In the event the water entrainment exceeds the capacity of the secondary water return line 100, the additional water entrainment may be sent through the quench ring 72 by the primary water return pump 94.

In addition, in certain embodiments, as illustrated in FIGS. 3 and 4, the water bypass line 110 may extend from the secondary water return line 100 back to the gas scrubber unit sump 90 of the gas scrubber unit 20. In particular, a portion of the water being transferred through the secondary water return line 100 may be directed back into the gas scrubber unit sump 90 through a gas scrubber unit sump inlet 112. In general, the water bypass line 110 may be used to attain a higher degree of control of the amount of water being transferred from the gas scrubber unit sump 90 to the quench chamber sump 80. For example, in certain embodiments, a bypass control valve 114 may be used to control the amount of water bypassed from the secondary water return line 100 based on the current flow rate of water to the quench chamber sump 80.

In addition, although not illustrated, all of the control valves and variable-speed pumps illustrated in FIGS. 2 through 4 may be controlled by a process controller to manipulate the flow rates of the quench water through the primary water return line 76 and the supplemental water through the secondary water return line 100. The process controller may, in certain embodiments, be a physical computing device specifically configured to obtain (e.g., receive) measurements from sensors (e.g., flow sensors, pressure sensors, etc.) in the water return lines 76, 100, which may help control the flow rates of the quench water and supplemental water through the primary and secondary water return lines 76, 100, respectively. More specifically, the process controller may include input/output (I/O) devices for receiving the sensor measurements. In addition, the process controller may include a memory device and a machine-readable medium with instructions encoded thereon for determining when the flow rates of the quench water through the primary water return line 76 and the supplemental water through the secondary water return line 100 should be increased, decreased, or maintained.

Figure 5A:
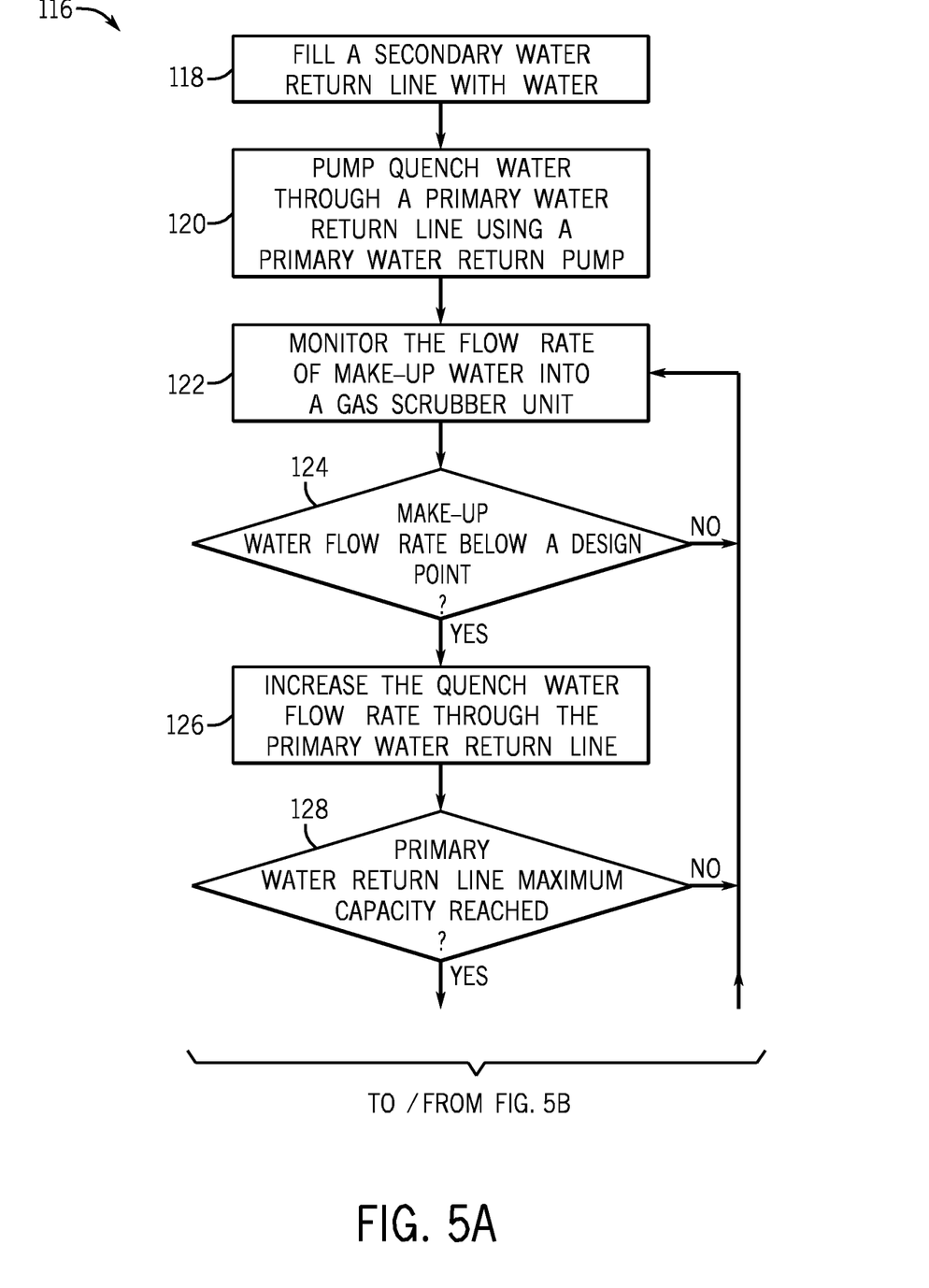
FIGS. 5A and 5B illustrate a flow chart of an exemplary method for controlling the flow rates of quench water through the primary water return line and supplemental water through the secondary water return line.
Figure 5B:
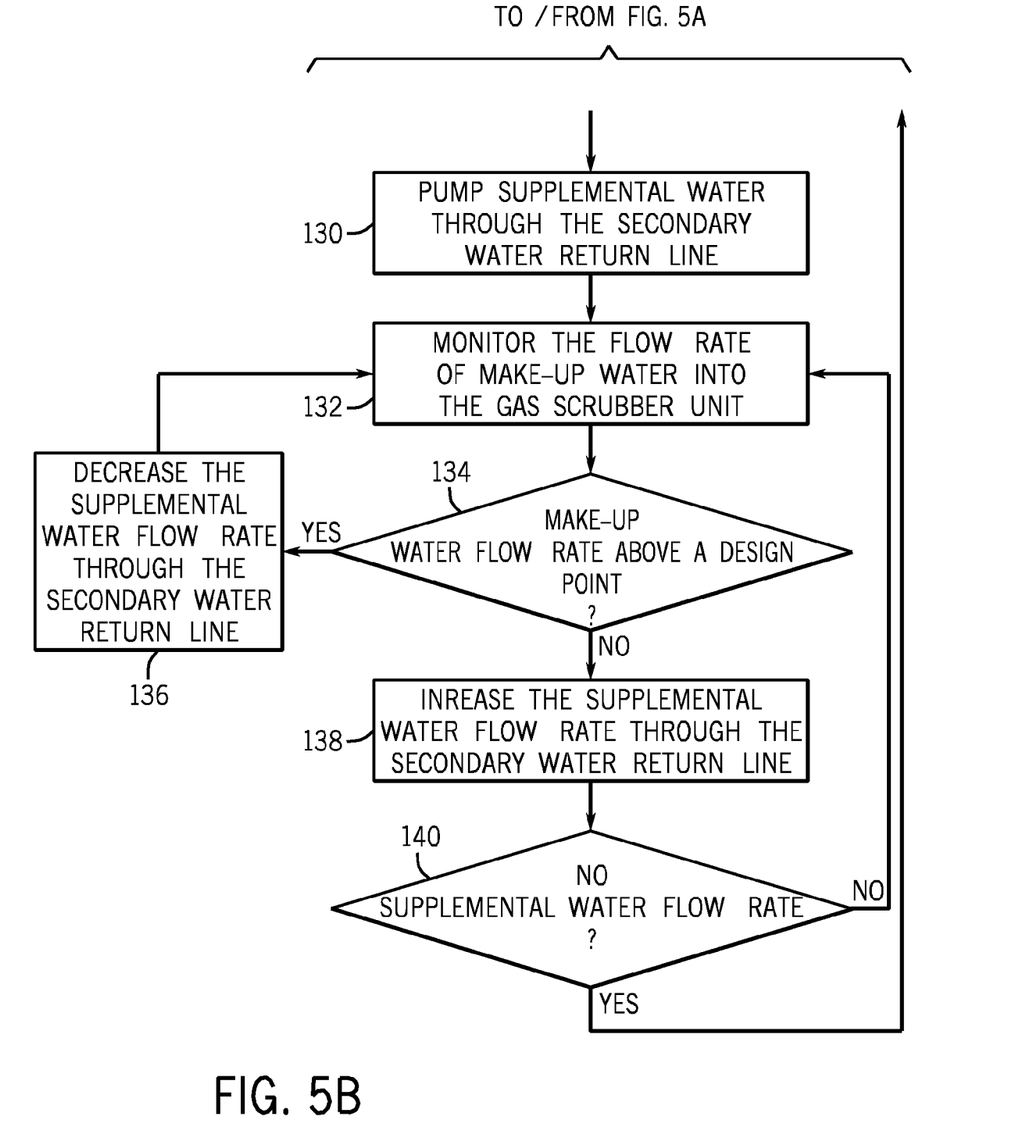

The process steps performed by the process controller (or internal logic associated with the control valves or variable-speed pumps) may generally be the same. For example, FIGS. 5A and 5B illustrate a flow chart of an exemplary method 116 (e.g., a computer-implemented method) for controlling the flow rates of quench water through the primary water return line 76 and supplemental water through the secondary water return line 100. At step 118, the secondary water return line 100 may be filled with water. As described above, in the embodiment illustrated in FIG. 4, filling the secondary water return line 100 may ensure that the secondary water return pump 108 on the secondary water return line 100 is primed and ready to operate. At step 120, quench water may be pumped through the primary water return line 76 using the primary water return pump 94.

At step 122, the flow rate of make-up water into the gas scrubber unit 20 may be monitored. At step 124, a determination may be made whether the make-up water flow rate has decreased to below a design point. If, at step 124, the make-up flow rate is determined to be above the design point, the method 116 may continue back to step 122, where the flow rate of make-up water into the gas scrubber unit 20 may continue to be monitored. However, if at step 124, the make-up water flow rate is determined to be below the design point, the method 116 may continue to step 126, where the quench water flow rate through the primary water return line 76 may be increased. For instance, in the embodiment illustrated in FIG. 3, the primary control valve 96 may be opened a certain amount. However, in the embodiment illustrated in FIG. 4, the speed of the variable-speed primary water return pump 94 may be increased or, in certain embodiments, the primary and secondary water return pumps 94, 108 may operate at constant speeds with flow control (e.g., via the flow control sensors 98 and 106 and associated flow controllers) and active bypass (e.g., via the water bypass line 110), as needed.

At step 128, a determination may be made whether the maximum capacity of the primary water return line 76 has been reached. For example, under normal operating conditions, the flow rate of quench water into the quench ring 72 through the primary water return line 76 may range between approximately 800 gallons per minute (gpm) to approximately 1800 gpm. Depending on the type of gasifier 16 used, this range may be modified. However, the maximum capacity of the primary water return line 76 may range between approximately 1100 gpm to approximately 2500 gpm. Again, depending on the type of gasifier 16 used, this range may be modified. If, at step 128, it is determined that the capacity of the primary water return line 76 has not yet been reached, the method 116 may continue back to step 122, where the flow rate of make-up water into the gas scrubber unit 20 may continue to be monitored. However, if at step 128, it is determined that the capacity of the primary water return line 76 has been reached, the method may continue to step 130, where supplemental water may begin being pumped through the secondary water return line 100 while the flow rate of quench water through the primary water return line 76 may be returned to normal operating conditions. For instance, in the embodiment illustrated in FIG. 3, the secondary control valve 104 may be opened a certain amount and/or the primary control valve 96 may be closed a certain amount. However, in the embodiment illustrated in FIG. 4, the variable-speed secondary water return pump 108 may be turned on and/or the speed of the variable-speed primary water return pump 94 may be decreased. In addition, in certain embodiments, the primary and secondary water return pumps 94, 108 may operate at constant speeds with flow control (e.g., via the flow control sensors 98 and 106 and associated flow controllers) and active bypass (e.g., via the water bypass line 110), as needed.

At step 132, the flow rate of make-up water into the gas scrubber unit 20 may again be monitored. At step 134, a determination may be made whether the make-up water flow rate has increased above the design point. If, at step 134, the make-up flow rate is determined to have increased above the design point, the method 116 may continue to step 136, where the flow rate of supplemental water through the secondary water return line 100 may be decreased. For instance, in the embodiment illustrated in FIG. 3, the secondary control valve 104 may be closed a certain amount and/or the primary control valve 96 may be opened a certain amount. However, in the embodiment illustrated in FIG. 4, the speed of the variable-speed secondary water return pump 108 may be decreased and/or the speed of the variable-speed primary water return pump 94 may be increased. From step 136, the method 116 may continue back to step 132, where the flow rate of make-up water into the gas scrubber unit 20 may continue to be monitored.

However, if at step 134, the make-up flow rate is determined to still be below the design point, the method 116 may continue to step 138, where the flow rate of supplemental water through the secondary water return line 100 may be increased. For instance, in the embodiment illustrated in FIG. 3, the secondary control valve 104 may be opened a certain amount and/or the primary control valve 96 may be closed a certain amount. However, in the embodiment illustrated in FIG. 4, the speed of the variable-speed secondary water return pump 108 may be increased and/or the speed of the variable-speed primary water return pump 94 may be decreased. At step 140, if the flow rate of supplemental water through the secondary water return line 100 has decreased to zero, the method 116 may continue back to step 122, where the flow rate of make-up water into the gas scrubber unit 20 may continue to be monitored. Otherwise, the method 116 may continue back to step 132, where the same may be done.

Technical effects of the disclosed embodiments include providing systems and methods for operating a gasifier quench scrubber system under high entrainment. In particular, as described above, supplemental water may be pumped directly into the quench chamber sump 80 of the gasifier 16 from the gas scrubber unit 20 through the secondary water return line 100. By directing the supplemental water directly into the quench chamber sump 80, the gasifier 16 may be capable of operating at higher syngas throughput rates with minimal or no changes to the reaction chamber 62 or the quench chamber 64 of the gasifier 16, the primary water return line 76, or the primary water return pump 94. In particular, the disclosed embodiments allow for increased flow rates of water into the quench chamber 64 of the gasifier 16. In other words, the disclosed embodiments provide additional entrainment control capability and features to respond to variable and unexpectedly high levels of entrainment. Moreover, the disclosed embodiments provide for additional water in the quench chamber sump 80 to protect against excessive evaporation. The disclosed embodiments may be part of new installations or, alternatively, may be implemented as retrofit additions to existing gasifier quench scrubber systems that are experiencing high entrainment levels. In addition, the disclosed embodiments may be applied to any other applications that use a water bath to quench and/or scrub a gas stream.

It should be noted that the particular embodiments described herein are not intended to be limiting. For example, the disclosed embodiments may also apply to a quench section which is not directly below the gasifier and for a quench section which may be located below a radiant syngas cooler. The disclosed embodiments may also be applied to a quench section in which spray nozzles are incorporated, instead of or in addition to a quench ring. In addition, the disclosed embodiments may include multiple scrubbers attached to the quench section, with similar water control as described.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
   a gasifier, comprising:
      a reaction chamber configured to convert a hydrocarbon feedstock, oxygen, and steam into a synthetic gas; and
      a quench chamber configured to cool the synthetic gas;
   a gas scrubber configured to remove contaminants and water from the synthetic gas;
   a synthetic gas transfer line from the quench chamber to the gas scrubber, wherein the synthetic gas transfer line is configured to transfer the synthetic gas from the quench chamber to the gas scrubber;
   a first water return flow line from a gas scrubber sump of the gas scrubber to a quench ring of the quench chamber, wherein the first water return flow line is configured to transfer a first flow of the water to the quench ring of the quench chamber;
   a second water return flow line from the gas scrubber sump of the gas scrubber directly to a quench chamber sump of the quench chamber, wherein the second water return flow line is configured to transfer a second flow of the water removed from the synthetic gas to the quench chamber sump of the quench chamber; and
   at least one pump configured to pump the first flow of water through the first water return flow line and configured to pump the second flow of water through the second water return flow line.

2. The system of claim 1, wherein the at least one pump comprises a first pump configured to pump the first flow of water through the first water return flow line and a second pump configured to pump the second flow of water through the second water return flow line.

3. The system of claim 1, comprising a first control valve in the first water return flow line to control the first flow of water and a second control valve in the second water return flow line to control the second flow of water.

4. The system of claim 1, comprising a bypass line from the second water return flow line to the gas scrubber sump of the gas scrubber, wherein the bypass line is configured to transfer a portion of the second flow of water back to the gas scrubber sump of the gas scrubber.

5. A system, comprising:
   a quench chamber;
   a gas scrubber;
   a first flow line from a gas scrubber sump of the gas scrubber directly to a quench chamber sump of the quench chamber;
   a second flow line from the gas scrubber sump of the gas scrubber to a quench ring of the quench chamber;
   and at least one pump configured to pump a first flow of water from the gas scrubber sump of the gas scrubber directly to the quench chamber sump of the quench chamber through the first flow line and configured to pump a second flow of water from the gas scrubber sump of the gas scrubber to the quench ring of the quench chamber through the second flow line.

6. The system of claim 5, wherein the at least one pump comprises a first pump is configured to pump the first flow of water from the gas scrubber sump of the gas scrubber directly to the quench chamber sump of the quench chamber through the first flow line and pump the second flow of water from the gas scrubber sump of the gas scrubber to the quench ring of the quench chamber through the second flow line.

7. The system of claim 6, comprising a first control valve in the first flow line to control the first flow of water and a second control valve in the second flow line to control the second flow of water.

8. The system of claim 5, wherein the at least one pump comprises a first pump in the first flow line configured to pump the first flow of water from the gas scrubber sump of the gas scrubber directly to the quench chamber sump of the quench chamber through the first flow line and a second pump in the second flow line configured to pump the second flow of water from the gas scrubber sump of the gas scrubber to the quench ring of the quench chamber through the second flow line.

9. The system of claim 8, wherein the first and second pumps are variable-speed pumps or the first and second pumps are constant-speed pumps with flow control and active bypass.

10. The system of claim 9, comprising a controller configured to adjust the speed of the first and second pumps based on first and second flow rates of the first and second flows, respectively.

11. The system of claim 5, comprising a synthetic gas transfer line from the quench chamber to the gas scrubber.

12. The system of claim 5, comprising a bypass line from the first flow line to the gas scrubber sump of the gas scrubber.

13. The system of claim 5, comprising a gasifier having the quench chamber and the quench chamber sump.

* * * * *